US012512103B2

(12) United States Patent
 Merkel

(10) Patent No.: US 12,512,103 B2
(45) Date of Patent: Dec. 30, 2025

(54) CONTENTS BASED ON POLICY PERMISSIONS

(71) Applicant: Hewlett-Packard Development Company, L.P., Spring, TX (US)

(72) Inventor: Harold Merkel, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 505 days.

(21) Appl. No.: 17/265,838

(22) PCT Filed: Nov. 14, 2018

(86) PCT No.: PCT/US2018/061044
 § 371 (c)(1),
 (2) Date: Feb. 4, 2021

(87) PCT Pub. No.: WO2020/101670
 PCT Pub. Date: May 22, 2020

(65) Prior Publication Data
 US 2021/0295851 A1    Sep. 23, 2021

(51) Int. Cl.
 *G06F 21/32* (2013.01)
 *G10L 15/26* (2006.01)
 *G10L 17/26* (2013.01)
 *H04L 9/40* (2022.01)
 *G10L 15/08* (2006.01)
 *G10L 17/24* (2013.01)

(52) U.S. Cl.
 CPC ............. *G10L 17/26* (2013.01); *G06F 21/32* (2013.01); *G10L 15/26* (2013.01); *H04L 63/105* (2013.01); *H04L 63/20* (2013.01); *G10L 15/08* (2013.01); *G10L 17/24* (2013.01)

(58) Field of Classification Search
 CPC .......... G06F 21/32; G10L 17/24; G10L 15/08
 See application file for complete search history.

(56) References Cited

U.S. PATENT DOCUMENTS

| 8,738,374 | B2 | 5/2014 | Jaroker |
|---|---|---|---|
| 2003/0182119 | A1* | 9/2003 | Junqua ................. G10L 15/24 704/E15.041 |
| 2004/0133789 | A1* | 7/2004 | Gantman ........... G06Q 20/4014 713/189 |
| 2006/0089857 | A1 | 4/2006 | Zimmerman et al. |
| 2009/0037171 | A1 | 2/2009 | McFarland et al. |
| 2009/0299743 | A1 | 12/2009 | Rogers |
| 2011/0173705 | A1 | 7/2011 | Sundaram et al. |

(Continued)

FOREIGN PATENT DOCUMENTS

| CN | 101292282 A | 10/2008 |
|---|---|---|
| CN | 102047647 A | 5/2011 |

(Continued)

*Primary Examiner* — Feng-Tzer Tzeng
(74) *Attorney, Agent, or Firm* — Quarles & Brady LLP

(57) ABSTRACT

Example implementations relate to generating content based on policy permissions. For example, a non-transitory machine-readable medium including instructions executable by a processor to detect a plurality of audio profiles based on audio signals received, separate the plurality of audio profiles, determine when an audio profile of the plurality of audio profiles corresponds to a policy permission; and generate content for the audio profile based on the policy permission.

18 Claims, 4 Drawing Sheets

(56) References Cited

U.S. PATENT DOCUMENTS

| | | |
|---|---|---|
| 2011/0276325 A1 | 11/2011 | Tatum et al. |
| 2012/0259924 A1 | 10/2012 | Patil et al. |
| 2012/0323575 A1 | 12/2012 | Gibbon et al. |
| 2013/0117802 A1* | 5/2013 | Fendt .................. H04L 63/10 726/4 |
| 2013/0253929 A1 | 9/2013 | Weider et al. |
| 2014/0071273 A1 | 3/2014 | Balthasar et al. |
| 2014/0282825 A1 | 9/2014 | Bitran et al. |
| 2015/0081301 A1 | 3/2015 | Nicholson et al. |
| 2015/0135329 A1 | 5/2015 | Aghasaryan et al. |
| 2015/0235654 A1 | 8/2015 | Gibbon et al. |
| 2015/0356973 A1 | 12/2015 | Wansley et al. |
| 2016/0140956 A1* | 5/2016 | Yu ........................ G10L 15/08 704/240 |
| 2016/0300576 A1 | 10/2016 | Karpey et al. |
| 2017/0053653 A1 | 2/2017 | Sidi et al. |
| 2017/0125014 A1 | 5/2017 | Pogorelik et al. |
| 2018/0308501 A1 | 10/2018 | Johnson et al. |

FOREIGN PATENT DOCUMENTS

| | | |
|---|---|---|
| CN | 102355646 A | 2/2012 |
| CN | 102436812 A | 5/2012 |
| CN | 103956163 A | 7/2014 |
| CN | 104205127 A | 12/2014 |
| CN | 104462912 A | 3/2015 |
| CN | 104604200 A | 5/2015 |
| CN | 105096937 A | 11/2015 |
| CN | 105190641 A | 12/2015 |
| CN | 106057193 A | 10/2016 |
| CN | 106462832 A | 2/2017 |
| CN | 107862071 A | 3/2018 |
| EP | 2343668 A1 | 7/2011 |
| WO | WO-2018009969 A1 | 1/2018 |

\* cited by examiner

CONTENTS BASED ON POLICY PERMISSIONS

BACKGROUND

Audio recognition systems can identify audio signals. For example, an audio recognition system can identify words and phrases in spoken language. In some examples, an audio recognition system can identify a speaker instead of the spoken words and phrases.

DETAILED DESCRIPTION

Figure 1:
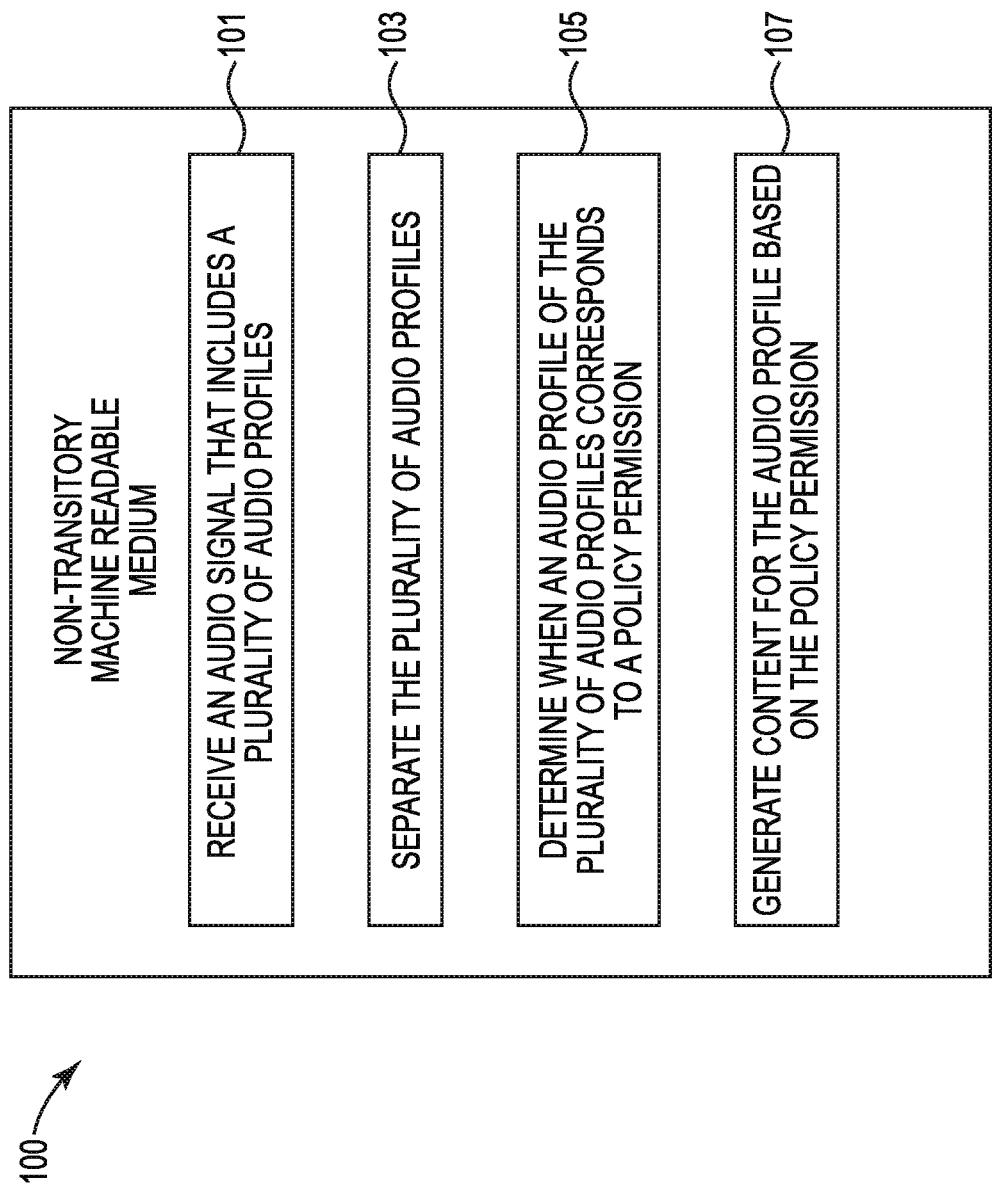
FIG. 1 illustrates an example of a non-transitory machine readable medium consistent with the present disclosure.

An audio recognition system can include an audio sensor and a device to convert audio signals to content. As used herein, the term "audio signal" refers to a representation of sound as an electrical voltage for analog signals and/or a binary number for digital signals. As used herein, the term "content" refers to a textual representation of a language. For example, content can be a text transcript, a printed document with human readable text, an email with human readable text displayed on a computing device, among other media that contains human readable text. In some examples, the content can include a textual representation of a language converted from audio signals to provide a visual representation of the audio signals in the form of text. In some examples, an audio recognition system can have a limited vocabulary of words and phrases, and it can identify words if they are spoken clearly. Other audio recognition systems can identify natural speech of a speaker. As referred herein, the term "speech" refers to the communication or expression of thoughts in spoken words. For example, speech can be a human speaker expressing an idea with audible words.

In some examples, an audio recognition system can use a speaker diarization process to identify the speaker. As used herein, the term diarization refers to a process of partitioning an input audio signals into homogeneous segments according to the speaker identity. In some examples, speaker diarization can be a combination of speaker segmentation and speaker clustering. Speaker segmentation can detect a speaker in an audio stream based on the audio segment the speaker is detected in. Speaker clustering can include grouping together speech segments of the speech on the basis of speaker characteristics.

With increasing number of broadcasts, meeting recordings, and voice mail collected, identifying speakers using an audio recognition system and converting the contents of the speech into text format is useful. In some examples, devices can include automated diarization and speech to text features. For example, a device can have a built in diarization capability as well as a feature to convert diarized speech to in a text format. In such instances privacy and security of the speech content can be compromised if the content of the speech is exposed to unintended parties. In some examples, a device's capability to diarization and converting diarized speech to into a text format can be disabled. However, disabling the feature can disable transcription of a whole meeting.

In some approaches, when a system receives audio data from multiple speakers, the system may perform blind diarization on the audio data in order to differentiate the speakers. In blind diarization, information may be unknown about the number of speakers and/or their identities. However, such approaches cannot differentiate the speakers and/or the content of the speech. Thus, such approaches may yet result in exposing or disabling the content of an entire meeting or broadcast without editing and/or redacting the transcript based on the content of the transcript.

Accordingly, the present disclosure describes a system and an apparatus to generate content for an audio profile based on a policy permission corresponding to the audio profile. For example, a system can include a predetermined set of rules and/or instructions for a plurality of speakers. Based on the predetermined rules, the system can generate content to conform to the rule and/or instructions to correspond to the policy permission. As used herein, the term "policy permission" refers to settings adopted based on the security profile associated with the speaker. As used herein the term "audio profile", refers to a set of measurable characteristics of a human voice that uniquely identifies an individual combined with speech. For example, audio profile can include distinctive pattern of voice characteristics of a speaker (e.g., frequency, duration, amplitude) and the words spoken by the individual.

A policy permission can be adopted based on the security profile associated with a user. A policy permission can be adopted and/or altered based on the preferences of the user. The user can adjust the policy permission of his/her audio profile based on his/her preferences. For example, a user can include a policy permission to encrypt and/or redact his/her audio profile to prevent unauthorized access. Similarly, the user can decrypt part or all of the encrypted content of his/her audio profile at a later time period. Generating content for a plurality of users based on the policy permissions of each of the users allows the users to generate content based on their preferences and prevents unauthorized access of unintended parties. Additionally, it provides a user the flexibility to capture his/her audio profiles or partial audio profiles while respecting the privacy and security of other users.

A policy permission can be based on a security profile of a speaker. For example, in a given situation each user of a plurality of users can have different security profiles (e.g., high, medium, low, etc.) corresponding to a policy permission. Each of the plurality of users with a similar security profile can also have different preference of the content he/she would like to generate into a text format, thus allowing the user to personalize his/her preference, while respecting the preferences of other users FIG. 1 illustrates an example of a non-transitory machine readable medium 100 consistent with the present disclosure. The non-transitory machine readable medium 100 can execute instructions 101, 103, 105, 107. A processor (not illustrated in FIG. 1) can execute instructions stored on the non-transitory machine readable medium 100. The non-transitory machine readable medium 100 can be any type of volatile or non-volatile memory or storage, such as random access memory (RAM), flash memory, read-only memory (ROM), storage volumes, hard disk, or a combination thereof.

The example medium 100 can store instructions 101 executable by a processor to receive an audio signal that includes a plurality of audio profiles. In some examples, the audio signal can be received by an audio sensor. In some examples, the audio sensor can be an audio end point device (e.g., speakers, microphones, recording devices). In some examples, the audio signals can include a plurality of audio profiles. The plurality of audio profiles can be received from more than one speaker. In some examples, the plurality of audio profiles can include multiple audio profiles from a single speaker received at different time periods. For example, an audio signal from a first speaker can be received from: a first meeting during a first time period, a second meeting during a second time period, and a third meeting during a third time period. The policy permission corresponding to the audio profile determined during the first meeting can be different from the policy permission corresponding to the second meeting. For example, the topic discussed in the first meeting (e.g., during an executive meeting) can include sensitive information of a company's portfolio. Based on the sensitive nature of the topic, the speaker can include a policy permission to encrypt the content of the meeting. In some examples, the topic discussed in the second meeting (e.g., company's townhall meeting) can include generic information about the company. Based on the generic nature of the meeting, a speaker can include a policy permission to transcribe the entire meeting into text format. Additionally, the content generated from each meeting can be different for the first speaker in response to his/her security profile being different in each meeting.

In some examples, the audio profiles can include a plurality of voice characteristic for different speakers. Each speaker can have a particular audio profile that can be used to identify the speaker. Each speaker can have a user profile that describes the preferences of the speaker for content to be created for each of a plurality of situations (e.g., the type of information being discussed, other users in the same meeting, etc.).

The example medium 100 can store instructions 103 executable by a processor to separate the plurality of audio profiles. As described herein, an audio profile can include distinctive pattern of voice characteristics (e.g., frequency, duration, amplitude) of an individual that uniquely identifies the individual. Audio profiles can be utilized to identify a user and/or user profile for a user. The user profile can describe the preferences of the speaker for content to be created for each of a plurality of situations (e.g., the type of information being discussed, other users in the same meeting, etc.).

In some examples, medium 100 can store instructions 103 executable by a processor to identify a speaker based on the audio profile utilizing voice biometric characteristics of the audio signal of the audio profile. As used herein, the term "voice biometric" refers to the attribute of the speaker's unique voice pattern. In some examples, the speaker's voice can be received in real time and compared with registered audio profiles. As used herein, the term "registered audio profile" refers to audio profiles that have been recorded at a time period prior to the time period the audio profiles are separated. In some examples, voice biometric can be used to authenticate a user. In some examples, voice biometrics can be used alone to separate the audio profiles. In some examples, voice biometric can be used as part of a two-factor process to separate audio profiles. For example, voice biometric authentication can be combined with an additional authentication technique (e.g., password, PIN) to provide an extra layer of security for sensitive information and financial transactions.

The example medium 100 can store instructions 105 executable by a processor to determine when an audio profile of the plurality of audio profiles corresponds to a policy permission. In some examples, a policy permission can include a policy to encrypt content for the audio profile when the content for the audio profile is generated. In some examples, a policy permission can include a policy to decrypt the content for the audio profile when the content for the audio profile is generated. In some examples, a policy permission can include a policy to redact the content for the audio profile when the content for the audio profile is generated. In some examples, no policy permission can be included for the audio profile and the topic discussed can be transcribed into text format.

A policy permission can include a policy to encrypt content for the audio profile. In some examples a public key cryptography can be used to encrypt the content converted for the audio profile. Public key cryptography can use public and private keys to encrypt the content converted for the audio profile in response to the policy permission applied to encrypt the audio profile. In some examples, the policy permission can include encrypting the entire content. For example, a speaker in a first meeting can discuss sensitive information and decide to include a policy permission to encrypt the entire meeting. In some examples, the policy permission can include encrypting parts of the content. For example, the speaker during a second meeting can also discuss some of the sensitive information discussed in the first, and can discuss some information that are not sensitive, and/or can be used in future meeting. Thus, the speaker can include a policy permission to encrypt the sensitive part of the second meeting, and not transcribe the remaining part into a text format.

In some examples, content can be encrypted in response to identifying specific audio profiles based on user profiles. In some examples, audio profiles for users can be identified based on position within an organization. In some examples, in determination that the audio profiles correspond to audio profiles of a first position (e.g. executive officers) with an organization, correspond to audio profiles of a second position (e.g., mid-level managers) with an organization, and correspond to audio profiles of a third position (e.g., general employees) with an organization, a policy permission can be applied to encrypt the content received from audio profiles of the first position and the second position. In such examples, the audio profiles received from the third position can remain unencrypted. The unencrypted content can be transcribed into a text format converted from the audio profile.

In some examples, the public key cryptography can use a key to decrypt the content converted for the audio profile in response to the policy permission applied to decrypt the audio profile. In some examples, the policy permission can include decrypting an entirely encrypted content at a later time. For example, a first policy permission can include encrypting the entire speech of a first speaker during a first time period. Based on the topic and/or the user's preference, the first policy permission can be altered to a second policy permission. The second policy permission can include, for example, decrypting the content received from the first speaker during the first time. The first policy permission can be altered in real time and/or during a second time period. In some examples, the policy permission can include decrypting parts of the content. For example, a first policy permission can include encrypting the entire speech of a first speaker during a first time period. A second policy, during a second time period, can include decrypting part of the content (e.g., generic information about the company that can be made public) received from the first speaker during the first time. In some examples, content can be decrypted in response to recognizing trigger words and/or recognizing an audio profile from a plurality of audio profiles. For example, in the meeting scenario described above, the policy permission can be applied to decrypt the audio profiles of the second position with an organization in response to determining their audio profiles as the second position with an organization.

In some examples, a policy permission can include a policy to redact content for the audio profile when the content for the audio profile is generated. In some examples, a policy permission can include a policy to redact content for the audio profile in real time. In some examples, the policy permission can include redacting the entire content. For example, when a first user is identified, the policy permission can include a policy to redact the content from an entire conversation that includes the first user. In some examples, the policy permission can include redacting parts of the content. For example, the policy permission can include a policy to redact content from a first user, but not redact content from a second user. In some examples, the policy permission can include a policy to redact specific topics that can be identified using trigger words. In such instances, content can be redacted in response to recognizing trigger words and/or recognizing specific audio profiles. For example, in the meeting scenario described above, a user can include a policy permission to redact the entire content for the audio profiles of the first position of an organization. In some examples, a user can include a policy permission to redact content for all audio profiles that include a sensitive topic (stock options for employees in the organization).

The example medium 100 can store instructions 107 executable by a processor to generate content for the audio profile based on the policy permission. In some examples the content generated can include encrypted content. In some examples the content generated can include decrypted content. In some examples the content generated can include redacted content. In some examples, content can include text transcript converted from the audio profile.

In some examples, the content generated for an audio profile during a first time period can be different from the content generated during a second time period corresponding to the policy permission. In some examples, the policy permission of the first and the second time period can conform to the security profile associated with the first and the second time period. For instance, a speaker can include a high security profile during a first time period and a medium security profile during a second time period. Based on that, the policy permission associated with the security profile of the first time period is different from the policy permission of the second time period. Thus, content generated during the first time period can be different from the content generated during the second time period conforming to the policy permission.

Figure 2:
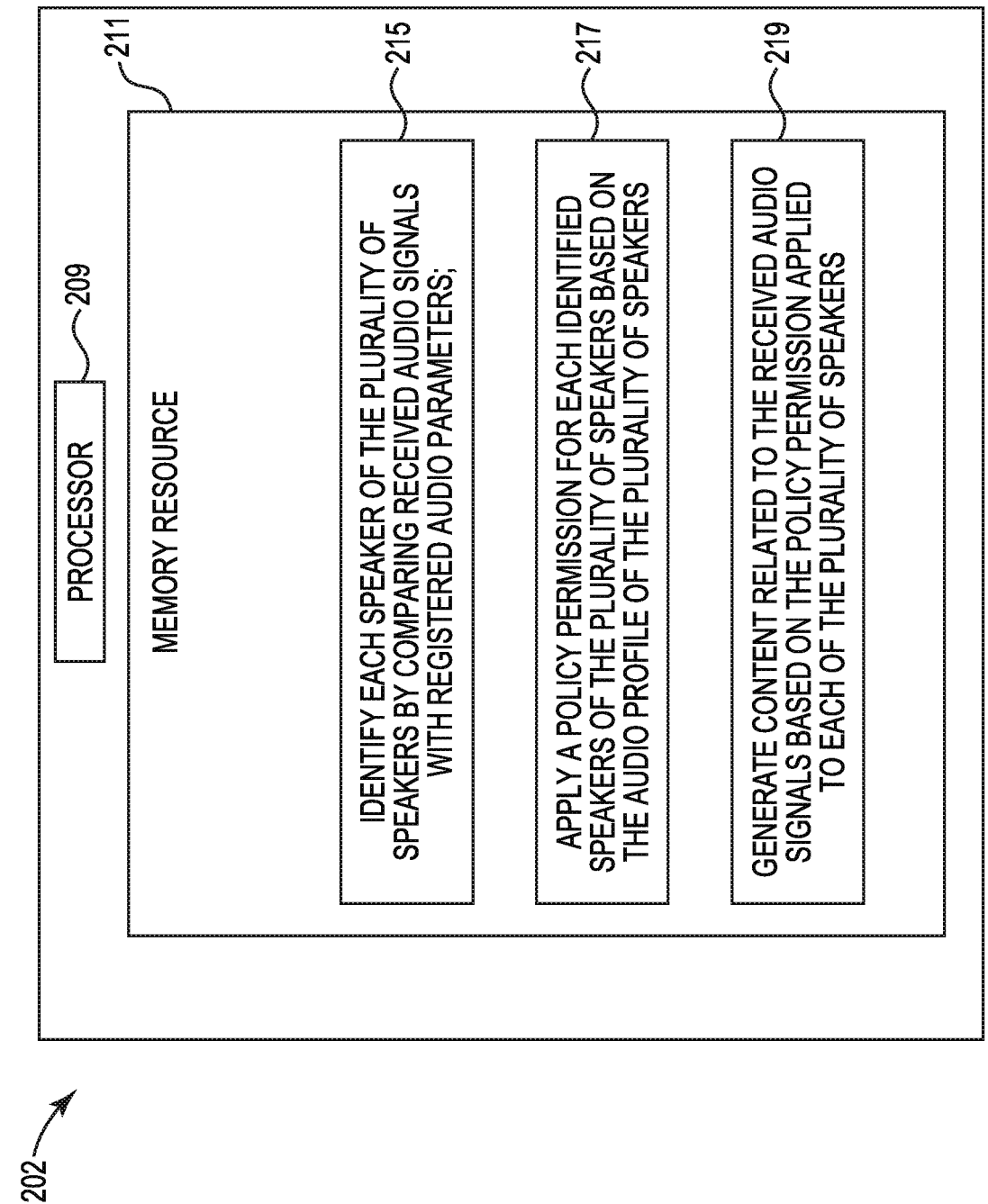
FIG. 2 illustrates an example of an apparatus consistent with the present disclosure.

FIG. 2 illustrates an example of an apparatus 202 consistent with the present disclosure. Apparatus 202 can include a processor 209 and a memory resource 211. Although not illustrated in FIG. 2 as to not obstruct the examples of the disclosure, apparatus 202 can be included in a computing device, such as computing device 308 described in FIG. 3. The memory resource 211 of the apparatus 202 can be used to store instructions 215, 217, and 219, executable by the processor 209 to perform operations described herein in relation to FIG. 2.

The processor 209, for example, can be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processor 209, for example, can include single or multiple cores on a chip, multiple cores across multiple chips, multiple cores across multiple devices, or suitable combinations thereof. The memory resource 211, for example, can be any type of volatile or non-volatile memory or storage, such as random-access memory (RAM), flash memory, read-only memory (ROM), storage volumes, a hard disk, or a combination thereof. The memory resource 211 can be used to store instructions such as instructions 215, 217, 219, executable by the processor 209. When executed by the processor 209, the instructions can cause the apparatus 202 to perform specific tasks and/or functions, as described herein.

The memory resource 211 can include instruction executable by the processor 209 to receive audio signals from a plurality of speakers. In some examples, the audio signals can be the representation sounds from the plurality of speakers. In some examples, audio signals can determine the identity of the plurality of speakers based on the plurality of speaker's audio profile. In some examples, the audio signals received from the plurality of speakers can be partitioned to homogeneous segments to determine the identity of a speaker by comparing the received audio signals with previously registered audio profiles. In some examples, the audio signals received from the plurality of speakers can be clustered in groups based on the characteristics of the audio signals.

In some examples, the received audio signal from a speaker of the plurality of speakers can determine the policy permission for a time period. For example, if an audio signal received from a speaker of the plurality speakers in a first meeting is determined to be from the first speaker, a policy permission to encrypt the content can be determined based on the identity of the first speaker. In some examples, the subject matter of the audio signal from a speaker can determine the policy permission of a time period. For example, if an audio signal received from a speaker of the plurality speakers is determined to include sensitive information, a policy permission to encrypt the data can be determined. In some examples, the policy permission can be triggered by a key word. In some examples, the speaker can be notified of a key word identified and the speaker can alter the policy permission in real time. For example, the memory resource 211 can include instructions to trigger a policy permission to in response to recognizing a key word associated with sensitive information (e.g., password, social security number, etc.). In response to recognizing the keyword associated with sensitive information, the speaker can be notified to select a policy permission to encrypt the content.

The memory resource 211 can include instruction 215, executable by the processor 209 to identify audio profile of each user of the plurality of user by comparing received audio signals with registered audio profiles. In some examples, identity of the speakers can be determined by using speaker diarization. In some examples, speaker diarization can be performed using an external device which provides automatic detection, classification, isolation, and tracking of a sound signal source. In such examples, sound signals can be identified, and changes in sound signals can be detected. Based on the changes, sound signals can be classified (e.g., based on gender, bandwidth) and clustered in the same identified groups. In some examples, identity of the speakers can be determined by using source diarization. In such examples, the source diarization process can be used to determine the number of distinct audio signal sources present within a given audio signals stream. For example, source diarization can be used to determine how many speakers are present in a given audio segment.

An audio profile of each speaker of the plurality of speakers can be identified by comparing the audio signals received from the plurality of speakers with registered audio profiles Registered audio profiles can include audio profiles that have been recorded at a time period prior to the time period the audio profiles are separated. For example, the audio profiles can be registered during a first time period and the received audio signals are compared with the registered audio profiles during a second time period. An audio profile can be registered years, months, weeks, days, hours and or minutes before the audio profiles are identified in real time.

The memory resource 211 can include instruction 217, executable by the processor 209 to select a policy permission for each identified user of the plurality of users based on the audio profile of the plurality of users. In some examples, a policy permission can include a policy to encrypt content generated in response to the identified audio profile of the speakers. In some examples, a policy permission can include a policy to redact the content generated in response to the identified audio profiles of the speakers.

In some examples, each of the speaker of the plurality of speakers can have different policy permissions based on the speaker's identified audio profile. In some examples, the memory resource 211 can include instruction executable by the processor 209 to identify different audio profiles among plurality of speakers. For example, a first audio profile, a second audio profile, and a third audio profile can be identified based on received audio signals from a first speaker, a second speaker and a third speaker. Based on the identity of the first audio profile of the first user, a first policy permission to encrypt the entire conversation can be applied. In contrast, based on the identity of the second audio profile of the second speaker, a second policy permission to redact the content received from the second speaker can be applied. Similarly, based on the identified third audio profile of the third speaker, a third policy permission to transcribe the contents into a text format can be applied.

In some examples, a speaker of the plurality of speakers can utilize a first policy permission for a first period of time and utilize a second policy permission for a second period of time. For example, the first speaker can include a first policy permission to encrypt the entire transcript for a first time period. In some examples, the first user can include a second policy permission to decrypt the encrypted data during a second time period.

The memory resource 211 can include instruction 219, executable by the processor 209 to generate content related to the received audio signals based on the policy permission applied to each of the plurality of speakers. In some examples the generated content can include encrypted content. In some examples the generated content can include decrypted content. In some examples the generated content can include redacted content. In some examples, content can include text transcript converted from the audio profile. In some examples, the content generated related to the received audio signals can be altered in response to an altered policy permission for the each identified speaker of the plurality of speakers.

Figure 3:
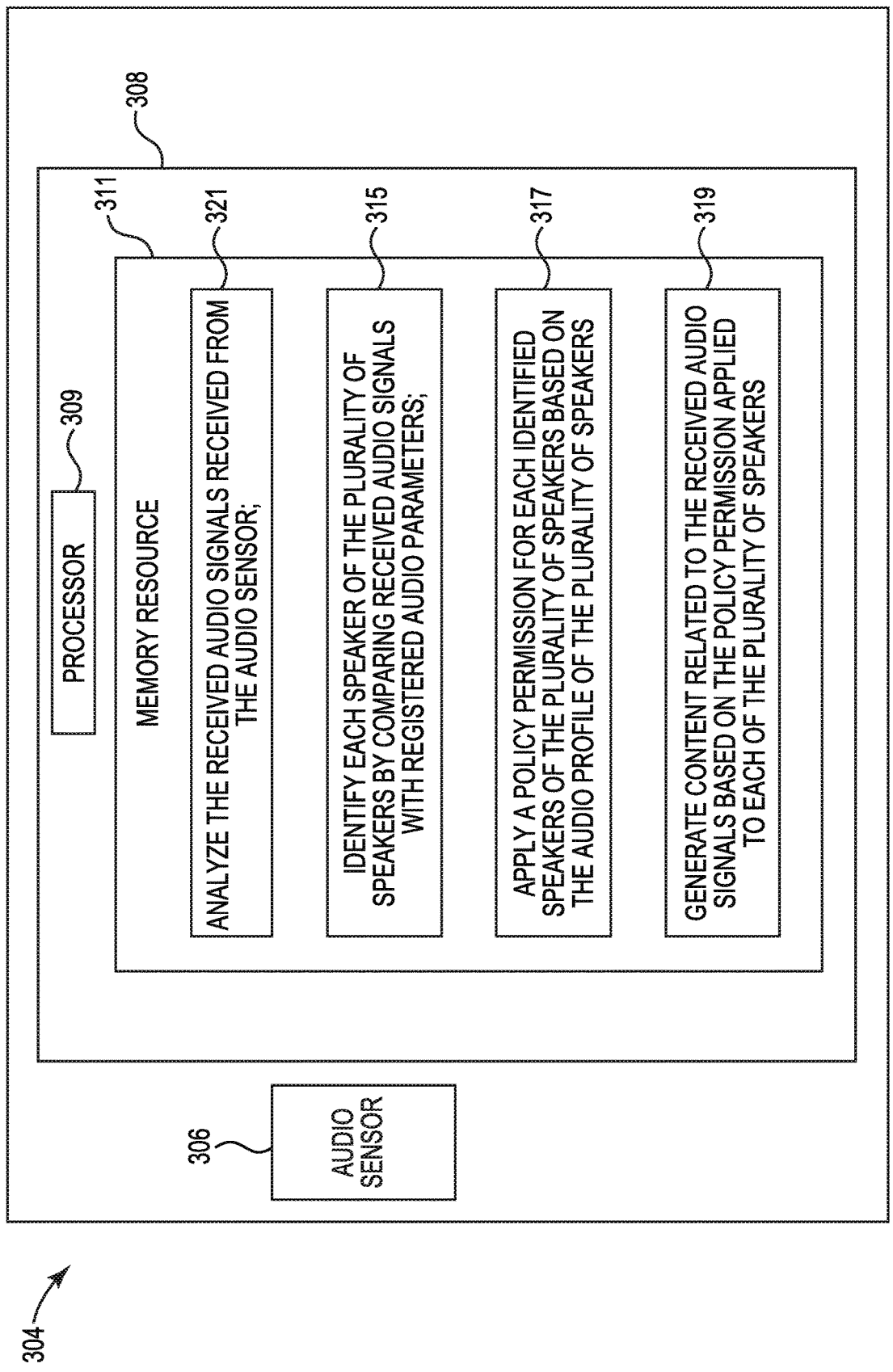
FIG. 3 illustrates an example of a system comprising an audio sensor and a computing device consistent with the present disclosure.

FIG. 3 illustrates an example of a system 304 comprising an audio sensor 306 and a computing device 308 consistent with the present disclosure. Computing system 308 can comprise a processor 309 and a memory resource 311. Memory resource 311 can include instructions 321, 315, 317, and 319 executable by the processor 309. When executed by the processor 309, the instructions can cause the system 304 to perform specific tasks and/or functions, as described herein.

Memory resource 311 of the computing device 308 can include instruction 321 to analyze the received audio signals received from the audio sensor 306. Analysis of the audio signals can include a process of sorting, structuring, and tagging audio signals. In some examples, during the process of sorting, structuring, and tagging the audio signals, the users' identities can remain unknown. For example, audio sensor 306 can receive audio signals from plurality of speakers (not shown in FIG. 3). Memory resource 311 include instruction 321 to sort the audio signals based on the source of the audio signals, structure them as audio signals received from a first speaker B, audio signals received from a second speaker B, and audio signals received from a third speaker C and tag them accordingly. During the sorting, structuring, and tagging process, identity of the each of the speaker A, B, C can remain unknown. In some examples, tagging can include assigning a keyword or term to a piece of information (e.g., words, audio profiles). Tagging can help describe an item and allows it to be found again by browsing or searching at a later time. In some examples, speaker diarization process can be used to analyze the received audio signals by detecting, classifying, isolating the source of a sound signals. In some examples, audio sensor 306 can be a speaker, a microphone and/or recording device.

Memory resource 315 of the computing device 308 can include instruction 315 to identify audio profile of each speaker of the plurality of speakers by comparing received audio signals with registered audio profiles. In some examples, the audio profile of a speaker can include the speaker's unique identifier. In some examples, the plurality of audio profiles can be received from more than one speaker. In some examples, the plurality of audio profiles can include multiple audio profiles from a single speaker received at different time periods, as described herein.

Memory resource 315 of the computing device 308 can include instruction 315 to identify audio profile of each speaker of the plurality of speakers by comparing received audio signals with registered audio profiles. In some examples, identity of the speakers can be determined by using speaker diarization. In some examples, identifying a speaker can include voice biometric authentication. In some examples, voice biometric can be used as part of a two-factor authentication process to separate audio profiles. For example, voice biometric authentication can be combined with something the speaker knows (e.g., password, PIN), or has (e.g., cell phone with a caller ID, a credit card) to provide an extra layer of security for sensitive information.

An audio profile of each speaker of the plurality of speakers can be identified by comparing audio signals received from the plurality of speakers with registered audio profiles. In some examples the audio profiles can be registered during a first time period and the received audio signals are compared with the registered audio profiles during a second time period.

The memory resource 311 can include instruction 317, executable by the processor 309 to select a policy permission for each identified speaker of the plurality of speakers based on the audio profile of the plurality of speakers. The policy permission can include instructions to encrypt, redact, and/or decrypt audio signals based on identified audio profiles. In some examples, selection of policy permission can be dynamic. In some examples, policy permission can be part of a default setup for computer system 308. In some examples, policy permission can be altered in real time.

The memory resource 311 can include instruction 319, executable by the processor 309 to generate content related to the received audio signals based on the policy permission applied to each of the plurality of speakers. In some examples the generated content can include encrypted content. In some examples the generated content can include decrypted content. In some examples the generated content can include redacted content. In some examples, content can include text transcript converted from the audio profile. In some examples, the content generated related to the received audio signals can be altered in response to altered policy permission for the each identified speaker of the plurality of speakers. In some examples, the content generated during a first time period can be tagged to identify a speaker of the plurality of speakers during a second time period. In some examples, tagging can include assigning a keyword or term to a piece of information (e.g., words, audio profiles). Tagging can help describe an item and allows it to be found again by browsing or searching at a later time.

Figure 4:
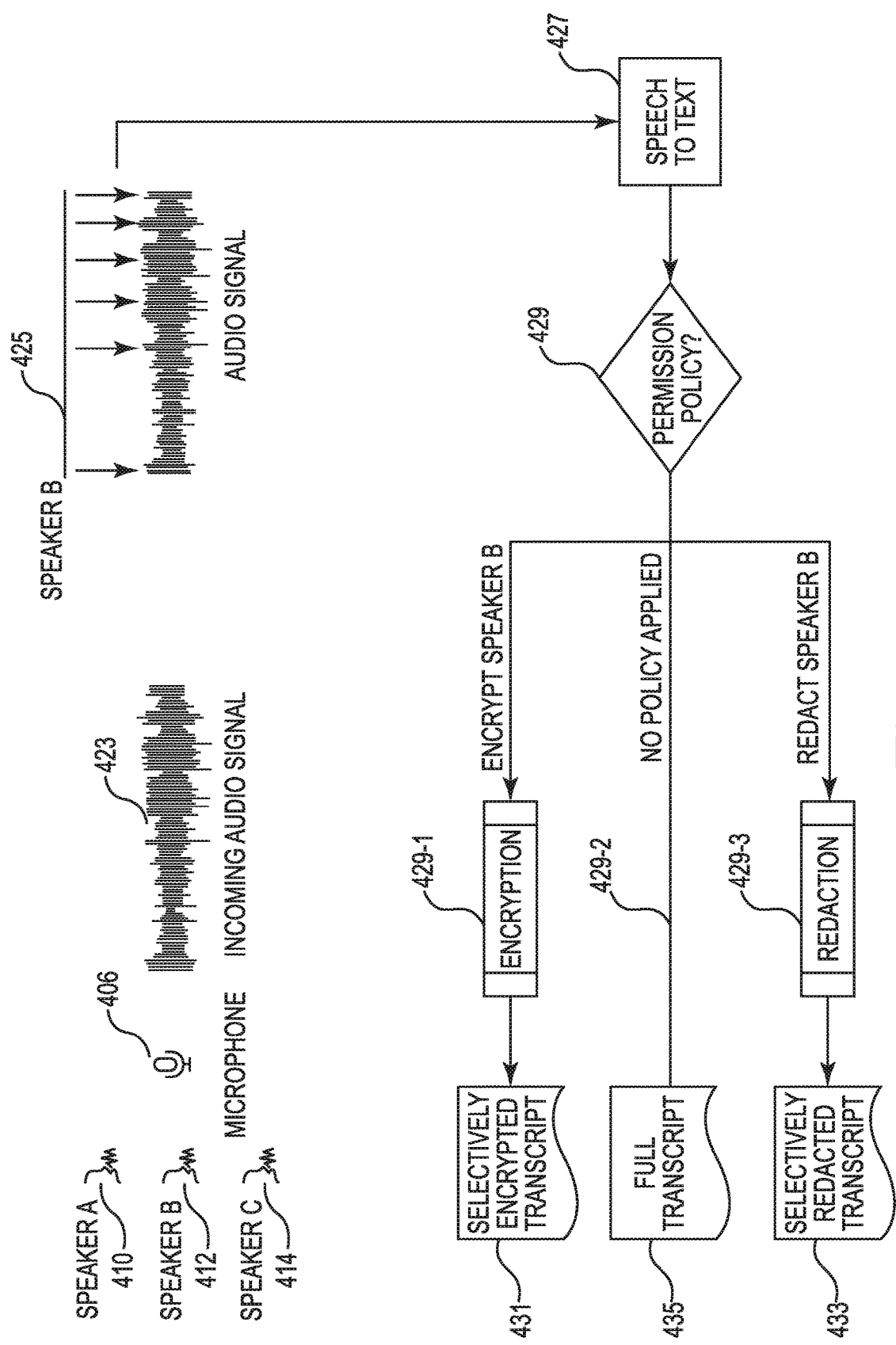
FIG. 4 illustrates an example flowchart of a system for generating content based on policy permissions consistent with the present disclosure.

FIG. 4 illustrates an example flowchart of system 440 for generating content based on policy permissions consistent with the present disclosure. System 440 can be utilized to generate content related to the received audio profile based on the policy permission applied to each of the plurality of speakers. System 440 can include a memory resource and a processor, analogous to the memory resource and processor described in relation to FIG. 2. The memory resource can include instructions executable by the processor, as described herein.

At 423, system 440 can include instruction to receive audio signals from a plurality of speakers 410, 412 and 414 using audio sensor 406. At 423, the audio signals from the plurality of speakers 410, 412, and 414 can be separated to identify each of the audio profile of the plurality of speakers 410 (first speaker) 412 (second speaker) and 414 (third speaker). The audio profile of each of the speakers can be identified by comparing the received audio signals, received at 423, with registered audio profiles.

At 425 the system 440 can include an instruction to identify the each of the speaker of the plurality of speakers by comparing the received audio signals with registered audio profiles. An audio profile of each speaker of the plurality of speakers can be identified by comparing audio signals received from the plurality of speakers with registered audio profiles. In some examples, the audio profiles can be registered during a first time period and the received audio signals are compared with the registered audio profiles during a second time period. In some examples, an audio recognition system can use a speaker diarization process to identify the each of the speakers 410, 412 and 414 at 425.

At 427, the system 440 can include an instruction to convert the speech to text content of the second speaker 412 audio profile. At 427, the system 440 can include an instruction to select a policy permission based on the audio profile of the speaker 412. In some examples, a policy permission can be adopted based on the security profile associated with the speaker. For example, at 427 the system 440 can include an instruction to convert the speech of the second speaker 412 into text format.

At 429, a policy permission is applied. A policy permission can be adopted based on the security profile associated with the user. A policy permission can be adopted and/or altered based on the preferences of the user. In some examples, the speaker can adjust the policy permission of his/her audio profile based on his/her preferences. For example, a user can include a policy permission to encrypt and/or redact his/her audio profile to prevent unauthorized access. Similarly, the user can decrypt part or all of the encrypted content of his/her audio profile at a later time period. For example, at 429-1 the system 440 can include instruction to select a policy permission to encrypt the content of the speaker 412 based on speaker's preference 412. At 429-3 the system 440 can include instruction to select a profile policy permission to redact the content of the speaker 412. At 429-2, the system 440 can include instruction to select no policy permission based on the speaker's preference.

At 431, the system 440 can include instruction to generate selectively encrypted content based on the policy permission applied at 429-1. For example, the speaker 412 in a first meeting can discuss sensitive information and decide to include a policy permission to encrypt the entire meeting. In some examples, the policy permission can include encrypting parts of the content. For example, the speaker 412 during a second meeting can also discuss some of the sensitive information discussed in the first, and can discuss some information that are not sensitive, and/or can be used in future meetings. Thus, the speaker 412 can include a policy permission to encrypt the sensitive part of the second meeting, and not transcribe the remaining part into a text format. In some examples a public key cryptography can be used to encrypt the content.

At 433, the system 440 can include instruction to selectively generate decrypted content on the policy permission applied to 429-2. In some examples, the public key cryptography can use a key to decrypt the content converted for the audio profile in response to the policy permission applied to decrypt the audio profile. In some examples, the policy permission can include decrypting an entirely encrypted content at a later time. For example, a first policy permission can include encrypting the entire speech of the speaker 412 during a first time period. A second policy, during a second time period, can include decrypting the content received from the first speaker 412 during the first time. In some examples, the policy permission can include decrypting parts of the content. For example, a first policy permission can include encrypting the entire speech of a first speaker during a first time period. A second policy, during a second time period, can include decrypting part of the content (e.g., generic information about the company that can be made public) received from the first speaker during the first time.

At 435 the system 440 can include instruction to generate a full transcript of the spoken content based on policy permission to transcribe the content into text format being applied at 429-2. In some examples, the speaker 412 can refrain from selecting a policy permission transcribe the whole content of the speaker's speech into text format.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A system, comprising:
a processor; and
a memory resource coupled to the processor, the memory resource storing machine readable instructions that, when executed by the processor, cause the processor to:
receive an audio signal comprising speech from one or more speakers,
segment, by analyzing voice biometric characteristics within the audio signal, the audio signal into a plurality of audio profiles,
compare the plurality of audio profiles with a set of registered audio profiles to identify a target audio profile from among the plurality of audio profiles,
select, based on a security profile associated with the target audio profile, a policy permission specifying how textual content derived from the audio signal is to be processed, wherein the security profile associated with the target audio profile is based on a role or position of a speaker within an organization, and wherein the policy permission is selected in response to a context of the audio signal, the context includes at least one of a meeting type or a discussed topic, and
generate, in accordance with the policy permission, the textual content associated with the target audio profile.

2. The system of claim 1, wherein the instructions cause the processor to identify, by analyzing the voice biometric characteristics, a user for the target audio profile.

3. The system of claim 2, wherein the processor is to select the policy permission based on the security profile associated with the user.

4. The system of claim 1, wherein the instructions cause the processor to encrypt the textual content generated for the target audio profile in response to the policy permission specifying to encrypt the textual content.

5. The system of claim 4, wherein the instructions further cause the processor to decrypt encrypted content based on a subsequent policy permission.

6. The system of claim 1, wherein the instructions cause the processor to redact portions of the textual content generated for the target audio profile in response to the policy permission specifying to redact the textual content.

7. The system of claim 6, wherein the processor is to identify the redacted portions in response to identifying sensitive information within the target audio profile.

8. The system of claim 1, wherein the instructions cause the processor to generate a full text transcript of the target audio profile when the policy permission specifies to transcribe the textual content.

9. A method, comprising:
receiving, by a processor, an audio signal comprising speech from one or more speakers;
analyzing, by the processor, voice biometric characteristics within the audio signal to segment the audio signal into a plurality of audio profiles;
comparing, by the processor, the plurality of audio profiles with a set of registered audio profiles to identify a target audio profile from among the plurality of audio profiles;
selecting, by the processor based on a security profile associated with the target audio profile, a policy permission that specifies how textual content derived from the audio signal is to be processed, wherein the security profile associated with the target audio profile is based on a role or position of a speaker within an organization, and wherein the policy permission is selected in response to a context of the audio signal, the context includes at least one of a meeting type or a discussed topic; and
generating, by the processor in accordance with the policy permission, the textual content associated with the target audio profile.

10. The method of claim 9, wherein identifying each audio profile comprises utilizing the voice biometric characteristics of the audio signal.

11. The method of claim 10, wherein the voice biometric characteristics include at least one of frequency, duration, or amplitude of the audio signal.

12. The method of claim 9, wherein the policy permission specifies whether to encrypt, redact, or transcribe the textual content generated from the target audio profile.

13. The method of claim 12, further comprising:
encrypting the textual content generated for an audio profile when the policy permission specifies to encrypt the textual content; and
decrypting the textual content based on a subsequent policy permission.

14. The method of claim 12, further comprising:
redacting portions of the textual content generated for an audio profile when the policy permission specifies to redact the textual content,
wherein the processor identifies redacted portions of the textual content based on identifying sensitive information within the target audio profile.

15. The method of claim 9, wherein the target audio profile uniquely identifies one of the speakers in the audio signal.

16. A non-transitory machine-readable medium storing instructions that, when executed by a processor, cause the processor to:
receive an audio signal comprising speech from one or more speakers;
segment, by analyzing voice biometric characteristics within the audio signal, the audio signal into a plurality of audio profiles;
compare the plurality of audio profiles with a set of registered audio profiles to identify a target audio profile from among the plurality of audio profiles;
select, based on a security profile associated with the target audio profile, a policy permission specifying how textual content derived from the audio signal is to be processed, wherein the security profile associated with the target audio profile is based on a role or position of a speaker within an organization, and wherein the policy permission is selected in response to a context of the audio signal, the context includes at least one of a meeting type or a discussed topic; and generate, in accordance with the policy permission, the textual content associated with the target audio profile.

17. The non-transitory machine-readable medium of claim 16, wherein the target audio profile uniquely identifies one of the speakers in the audio signal.

18. The system of claim 1, wherein the target audio profile uniquely identifies one of the speakers in the audio signal.

* * * * *